United States Patent [19]
Metelitsa

[11] Patent Number: 6,008,943
[45] Date of Patent: Dec. 28, 1999

[54] LASERL OPTICAL SYSTEM FOR MICROMACHINING

[76] Inventor: Gregory Metelitsa, 50 Glenbrook Rd. #7H, Stamford, Conn. 06902

[21] Appl. No.: 08/979,351

[22] Filed: Nov. 26, 1997

[51] Int. Cl.⁶ .................................................. G02B 27/10
[52] U.S. Cl. ............................................................ 359/618
[58] Field of Search ...................................... 359/618, 529, 359/632

[56] References Cited

U.S. PATENT DOCUMENTS 5,224,200  6/1993  Rasmussen ............................... 385/146
5,805,342  9/1998  Gravely .................................... 359/618

Primary Examiner—Hung Xuan Dang
Assistant Examiner—Michael Lucas
Attorney, Agent, or Firm—Edward R. Hyde

[57] ABSTRACT

An optical system in which a coherent light beam is made more uniform in intensity in cross section. Two light shearing plates disposed at an angle to each other scramble the coherency of the light beam while homogenizing and expanding it. Each shearing plate has a partially reflecting element and a fully reflecting element. The resulting beam is of incoherent radiation having a high uniformity of illumination.

5 Claims, 3 Drawing Sheets

LASERL OPTICAL SYSTEM FOR MICROMACHINING

BACKGROUND OF THE INVENTION

1. Field of the Invention

The present invention relates to optical systems and more particularly to a system in which coherent radiation having variations of intensity is smoothed to provide a more uniformly illuminated image plane. More particularly the invention contemplates a laser light source of coherent light in which the light beam is modified to provide a beam of more uniformity in cross section. Such beams of high intensity and relatively uniform illumination are especially useful in the manufactures of semiconductor wafers.

2. Description of the Prior Art

Increased resolution and throughput requirements in micromachining require use of powerful monochromatic light sources as provided by lasers. However, while monochromaticity of laser radiation helps to increase resolution, the high coherency reduces it as described in Principles of optics by Born and wolf, Oxford 1970 fourth edition. Thus, prior art systems have been designed to reduce or eliminate coherency.

U.S. Pat. No. 4,619,508 reduces the coherency by breaking the beam into many spatially shifted parts using either a staircase prism, fiberoptic bundle, or an array of glass rods of different thicknesses. This, however, introduces a local loss of light due to diffraction on the edges of the staircase prisms or glass rod arrays, or obscuration of light by bevels and rolloffs, which result in a high non-uniformity of illumination.

A similar problem exists in another system of destroying the coherency, described in U.S. Pat. No. 5,224,200. This system employs a coherency delay line installed between the laser and homogenizer. The delay line comprises two mirrors, one partially reflecting, and one totally reflecting, arranged so that light incident from the laser first strikes the partially reflecting mirror. A portion of the beam passes through and a portion is reflected back to the totally reflective mirror. The reflected portion is in turn reflected back to the partially reflecting mirror at a position spaced from the position of initial incidence, where again a portion is transmitted, and a portion is reflected. This process is repeated until the reflected beam traverses the partially reflective mirror and finally bypasses the partially reflective mirror altogether. The series of beams transmitted through the partially reflecting mirror and the final beam that bypasses it all together, are focused through a lens into the homogenizer. The partially reflective mirror coating is made in such a way that all portions of the light beam transmitted through it are substantially equal in intensity. This is achieved by making the thickness of partially reflective coating on the partially reflective mirror decreasing at each successive position of incidence by the beam.

The magnitude of the spatial shift between adjacent beams must be equal to or exceed their size, otherwise it can not enter or exit the system without the energy loss. Resulting energy distribution is very non-uniform because of voids between adjacent beams formed due to the nonuniformity of the input laser beam, edge diffraction or shear separation. To correct the nonuniformity of illumination a mirror funnel homogenizer is employed and a large number of reflections is required to correct the problem. Losses associated with each reflection, result in a low throughput of the device.

SUMMARY OF THE INVENTION

The present invention provides a coherency scrambling beam delivery system, which destroys the coherency of the laser beam while homogenizing and expanding it. It consists of light shearing plates in which each plate consists of two elements providing two reflecting surfaces, the first surface of which is partially reflective and the second surface totally reflective. The shearing plates are disposed at an angle to each other, to shear the beam in different directions.

In order to provide an adjustable uniformity, the distance between beamsplitting and reflective elements of the shearing plates is variable.

The system includes an achromatic attenuator including a microlens array, followed by a variable aperture and a fourier transform lens system having the lens array at its front focal plane and a pattern mask at its back focal plane.

Against the foregoing background it is a primary object of the present invention to provide a high throughput laser micromaching optical system having a high uniformity of illumination and resolution.

A further object of the present invention is to provide an illuminating light source of high brightness to supply incoherent illumination from a coherent light source.

A still further object of the present invention is to provide an optical coherency scrambling system that provides incoherent radiation having a high uniformity of illumination.

Another object of the invention is to provide an efficient optical attenuater for exposure control.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF THE PREFERRED EMBODIMENT

Figure 1:
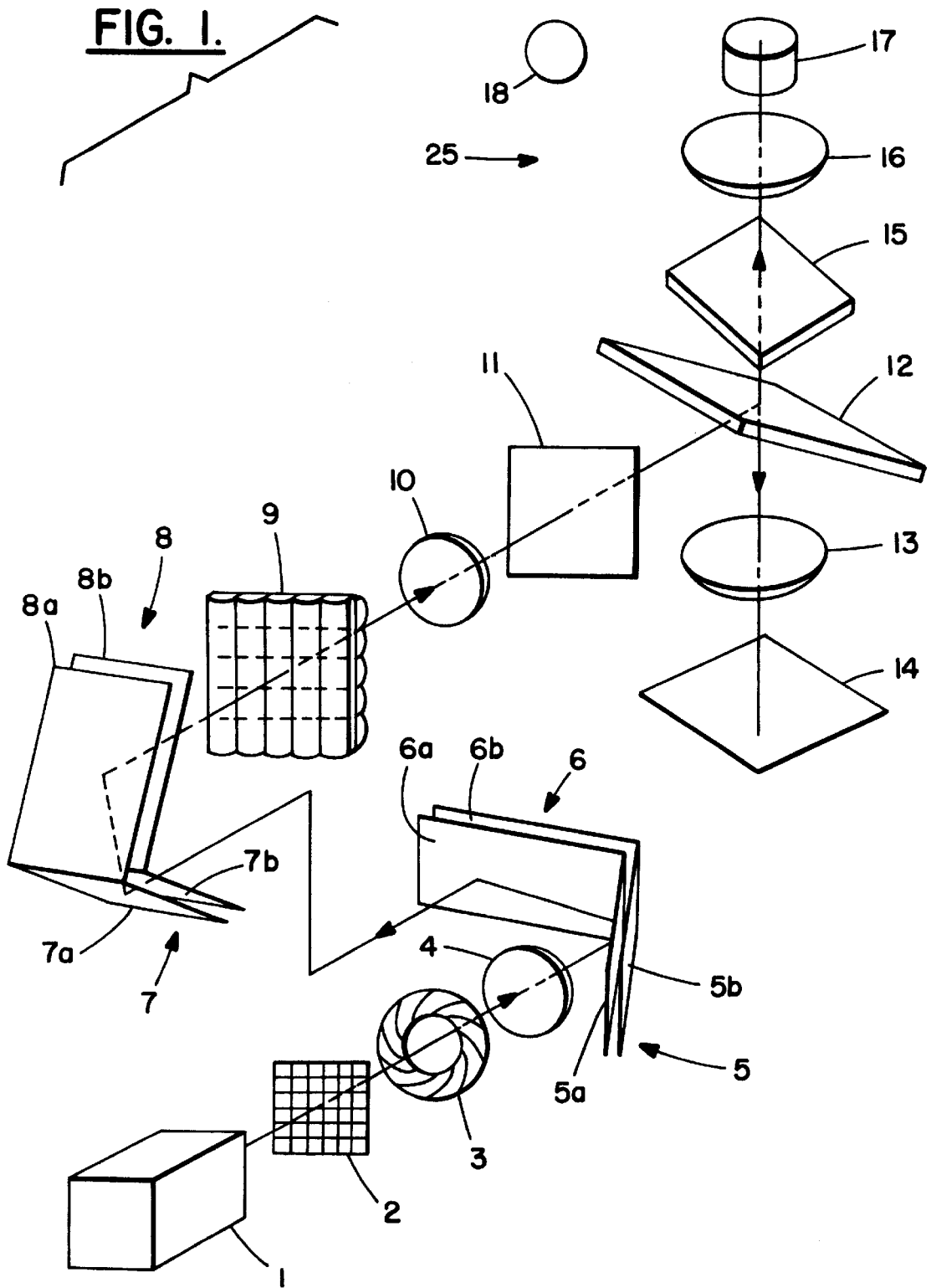
FIG. 1 is an optical layout of the laser system of the present invention.
Figure 2:
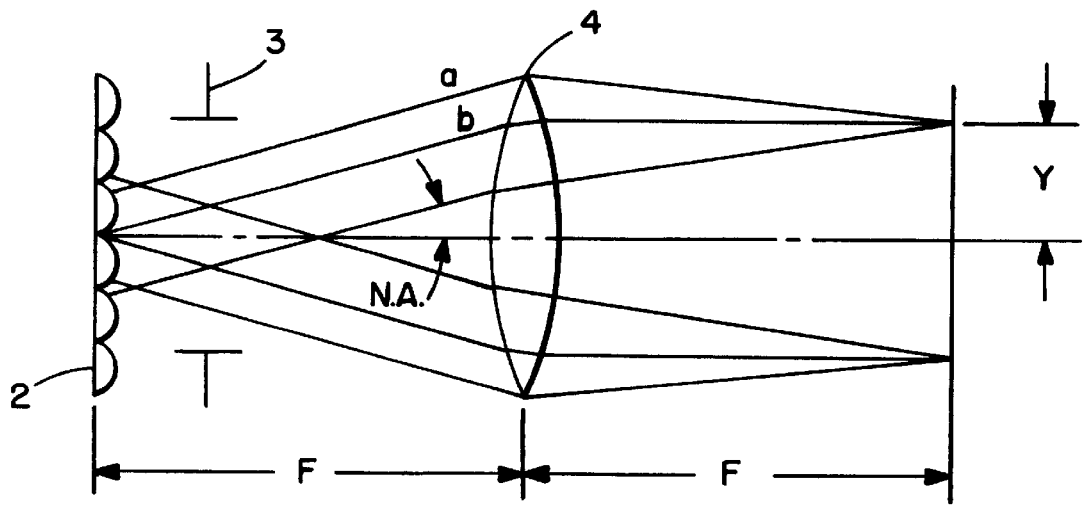
FIG. 2 is a ray trace of the optical attenuator.

Referring now to the drawings and more particularly to FIG. 1, there is shown a laser source optical system for micromachining a product such as a semiconductor wafer or chip.

Coherent light from laser 1 passes through an attenuator, which consists of microlens array 2, variable aperture 3 and Fourier transfer lens 4. The microlens array 2 is positioned at the front focus of the lens 4 and consists of a number of small lenses or lenslets that are smaller then the minimum opening of the adjustible aperture 3. As a result the field of illumination is not affected by the opening of the aperture. Because the Fourier lens 4 focuses all light in it's focal plane, the size of the illuminated field Y is defined by the Numerical Aperture of the array 2 of lenslets and the focus of the lens 4, in accordance with the formula:

$$Y = 2F \times N.A.$$

where

F is the focal length of the Fourier lens 4, and

N.A. is the Numerical Aperture of the array 2 lenslets. This attenuator operates in a broad range of wavelengths because it has no multilayer dielectric or polarization coatings, throughput of which is very sensitive to the wavelength.

Referring back to the FIG. 1, the light passed through the lens 4 enters the coherency scrambling beam delivery system which include a pair of shearing plates 5 and 6. Each plate is made as a two element mirror, the first element being partially reflective and the second element fully reflective. Thus shearing plate 5 is made of elements 5a and 5b and plate 6 of elements 6a and 6b. To maximize uniformity of illumination the partially reflective element 5a or 6a should have a specific reflectivity R', at which the first and second reflected rays have equal intensity.

This reflectivity relationship is as follows:

$$R' = T^2 \times R''$$

where

R' is the reflectivity of the surface of the element 5a,

T is the transmission of the shearing plate, and

R" is the reflectivity of the surface of the element 5b.

At reflectivity of element 5b surface R"=1 and zero absorption, one can calculate that if R'=0.4 the intensity of the first two beams is 0.4, and the third, fourth and fifth beam intensity is 0.15, 0.056, and 0.02 respectively. Thus, at this particular reflectivity of the beamsplitting layer, the first two beams carry 80% of the energy, have equal intensity and the shearing plate provides the best uniformity.

Figure 3A:
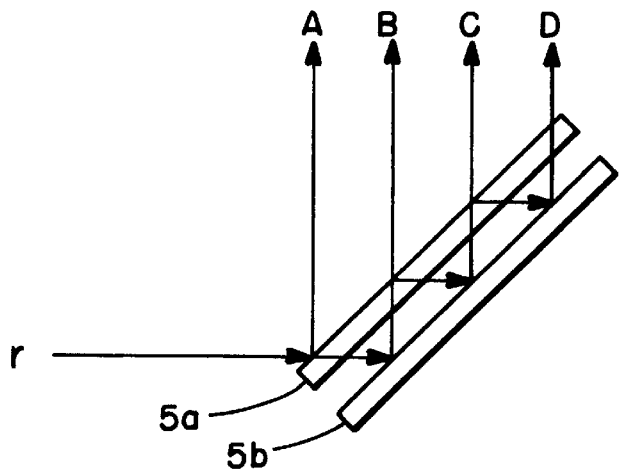
FIGS. 3A and 3B are respectively a ray trace through the first shearing plate and the beam intensity distribution after reflection from the plate.
Figure 3B:
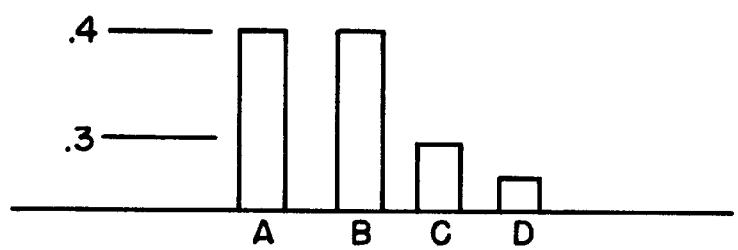

The ray trace through the shearing plate and the intensity diagram of the reflected beams is shown in FIGS. 3A and 3B. As seen in FIG. 3A, a ray r impinges on the surface of element 5a and a portion A is reflected and another portion passes through the plate to the surface of element 5b and reflected to the front surface where a portion B passes through and again another portion is reflected to form portion C. As noted above with R'=0.4 the first two ray portions carry 80% of the energy which is shown in FIG. 3B although the energy distribution is asymmetrical.

Figure 4:
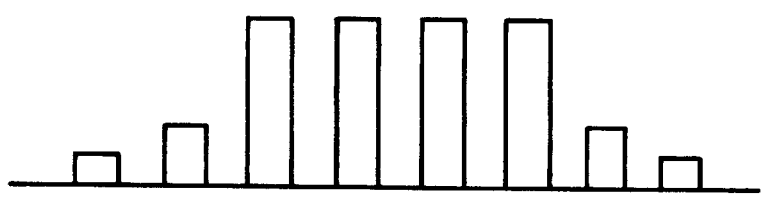
FIG. 4 shows the intensity distribution at the output of the second pair of shearing plates.

To make the distribution symmetrical, the beam is directed onto the second shearing plate 6 which is at a 90 degree angle to plate 5 so that it reflects light back, and shears the beam in the opposite direction, equalizing the intensity of left and right parts in horizontal direction as shown in FIG. 4.

It is easier to achieve good uniformity when the intensity profile of light delivered to the homogenizer is symmetrical in both horizontal and vertical directions. To achieve this, shearing plates 7 and 8 are provided and work similarly to plates 5 and 6, except they are oriented to shear beams in the vertical direction.

Figure 5:
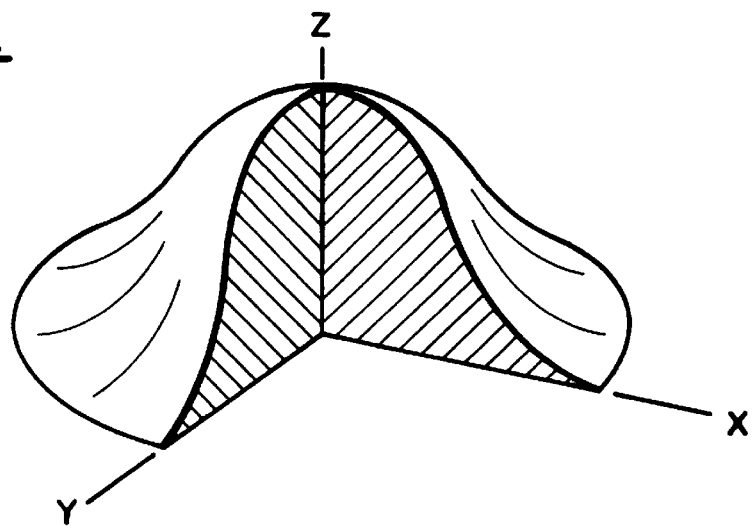
FIG. 5 illustrates the final intensity distribution at the output of the beam delivery system.

Although plates 5, 6 are described as horizontally oriented and plates 7, 8 vertically oriented it is understood that these terms simply describe the embodiment orientation of FIG. 1. The two pairs of plates need only be oriented at right angles or perpendicular to each other. The resulting output energy distribution is symmetrical in both vertical and horizontal directions as shown in FIG. 5. This system of shearing plates creates a very large number of beams in accordance with the formula:

$$N = A^M,$$

where

A is the number of beams created by a plate,

M is the number of shearing plates.

For example if A=5 four shearing plates create 625 beams.

After passing the second pair of plates 7, 8 light enters the homogenizer made of a lens array 9 installed in the focus of condenser lens 10. They expand and superimpose beams one over another in the image plane, creating a uniform illumination in the plane of mask 11. It is clear from the ray trace of FIG. 3A that along with a lateral displacement of each beam, the shearing plates produce a path difference between them. If this path difference exceeds the coherence length, beams become incoherent and image quality greatly increases.

Because the intensity distribution of excimer lasers is not symmetrical and vary with cavity alignment and/or aging, the resulting distribution is difficult to model and optimize.

Therefore, to adjust the best possible illumination, the distance between beamsplitting as elements 5a and 6a for example and reflective elements as 5b and 6b for example of shearing plates is made variable. As this distance changes, so does the separation between split beams which changes the resulting intensity distribution and makes the uniformity adjustable.

Figure 6A:
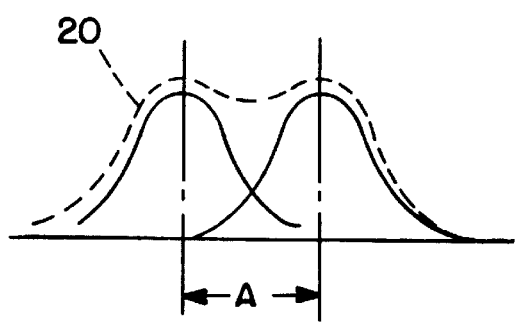
FIGS. 6A and 6B illustrate the intensity uniformity adjustment process.
Figure 6B:
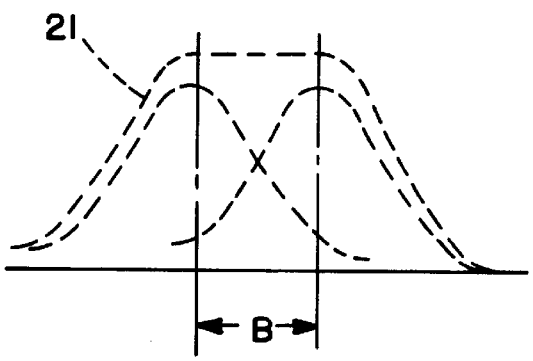
Figure 7:
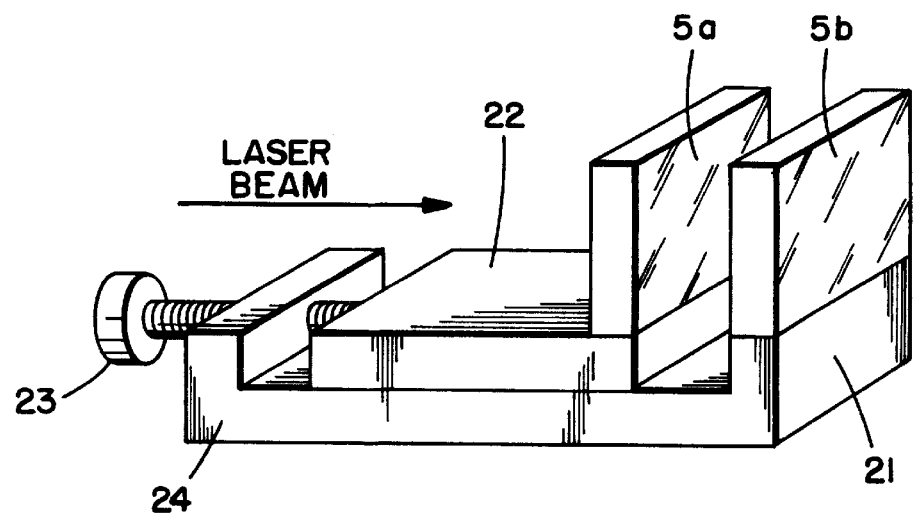
FIG. 7 illustrates an arrangement for adjusting the distance between the two substrates of the shearing plates.

Thus FIG. 6A shows the intensity distribution 20 of the split beams prior to distance adjustment of plates 5, 6 for example and FIG. 6B shows the more uniform distribution 21 after adjustment. The elements of a shearing plate such as 5 may be mounted and the distance between them adjusted in any convient manner. FIG. 7 illustrates one mounting arrangement. A vice type mechanism is provided including a stationary block 21 and movable block 22. A screw mechanism 23 passes through an upstanding projection 24 of stationary block 21 to move the movable block 22. The elements 5a and 5b are securred to movable block 22 and stationary block 21 as shown so that operation of the screw mechanism will adjust the distance between elements 5a and 5b.

Referring back to FIG. 1, after the beam passes through mask 11 it is reflected by beam splitter 12, through lens 13 to the wafer or workpiece 14. It is understood that the mask contains the design, as a micro electrical circuit that is to be engraved on Wafer 14.

A viewing mechanism to insure suitable alignment of the beam on the wafer is generally indicated by numeral 25. This includes a viewing light source 18, astigmatism corrector 15, viewing lens 16 and monitor 17 which may be a TV camera. Thus visible light from the source 18 directed to the wafer 14 passes back through the beamsplitter 12, the astigmatism corrector 15 and viewing lens 16 to the TV camera 17. In order to have high radiometric efficiency, the beamsplitter 12 is made as a plate rather than a cube. This reduces the number of layers of dielectric coatings and simplifies it. This reduction is especially significant when working at the 193 nm and shorter wavelength where range of materials for coatings is very limited.

The number of layers for coating which reflects 193 nm and transmits visible wavelength reaches thirty two which makes coating unstable and a low damage threshold, not lasting at the high irradiance required for micromaching. To compensate for the astigmatism introduced by the tilted plate beamsplitter 12, the lens 13 has the corrector 15, formed as a plate, installed at the same angle as beamsplitter 12 and having the same optical thickness, but positioned relative to the beamsplitter 11 at 90 degrees, so the normal to it's plane is in the plane perpendicular to the one containing the normal of the beamsplitter 12. This way the path difference between saggital and meridional beams introduced by the beamsplitter 12, is compensated by the corrector 15.

Having thus described the invention with particular reference to the preferred forms thereof, it will be obvious that various changes and modifications may be made therein without departing from the spirit and scope of the invention as defined in the appended claims.

What is claimed is:

1. A system to provide high intensity, uniform light suitable for micromachining comprising:

a laser light source providing coherent light;

an optical attenuator disposed to receive said coherent light and to provide acromatic light and control the intensity thereof;

a first pair of optical plates disposed at a right angle to each other to receive light from said optical attenuator;

each of said first pair of optical plates having a front partially reflecting element and a rear substantially fully reflecting element whereby coherent light from the laser light source is multiply reflected by each of said first pair of optical plates to provide a substantially incoherent light beam;

a second pair of optical plates disposed at a right angle to each other and to said first pair of optical plates to receive the substantially incoherent light beam from said first pair of optical plates;

each of said second pair of optical plates having a front partially reflecting element and a real substantially fully reflecting element whereby light from said first pair of optical plates is multiply reflected by said second pair of optical plates to provide symmetrical light distribution;

light homogenizer means to receive light from said second pair of optical plates whereby the light is expanded to a substantially uniform illumination;

mask means to receive the light from the light homogenizer means to provide a light pattern;

and means to receive the light pattern from the mask means.

2. The system set forth in claim 1 in which the front partially reflecting element of each optical plate of said first and second pair of optical plates has a reflectivity of:

$$R'=T \times R''$$

where

R' is the reflectivity of the partially reflecting element

T is the transmission of the optical plate

R" is the reflectivity of the rear element.

3. The system set forth in claim 1 including means to adjust the distance between the front and rear elements of each of the first pair of optical plates and the second pair of optical plates.

4. The system set forth in claim 1 in which said optical attenuator includes lens means;

a microlens array positioned at the front focal point of the lens means; and said mask means positioned at the back focal point of the said lens means.

5. A system to provide high intensity, uniform light suitable for micromachining comprising:

a laser light source providing a coherent light beam;

an optical attenuator disposed to receive said coherent light beam to provide acromatic light and control the intensity thereof;

a pair of optical plates disposed at a right angle to each other and positioned to receive the coherent light beam from said optical attenuator;

each of said pair of optical plates having a front element providing a partially reflecting surface and a rear element providing a substantially fully reflecting surface whereby the coherent light beam from the laser light source is multiply reflected by each of said pair of optical plates between the front and rear elements thereby to provide a substantially incoherent light beam; and means to adjust the distance between the front and rear elements of each of said pair of optical plates.

* * * * *